3,378,160
ASSEMBLY FOR MOUNTING AN ELECTRIC DEVICE
Ermanno Bassani, Corso Porta Vittoria 9, Milan, Italy
Filed June 16, 1966, Ser. No. 558,138
6 Claims. (Cl. 220—3.6)

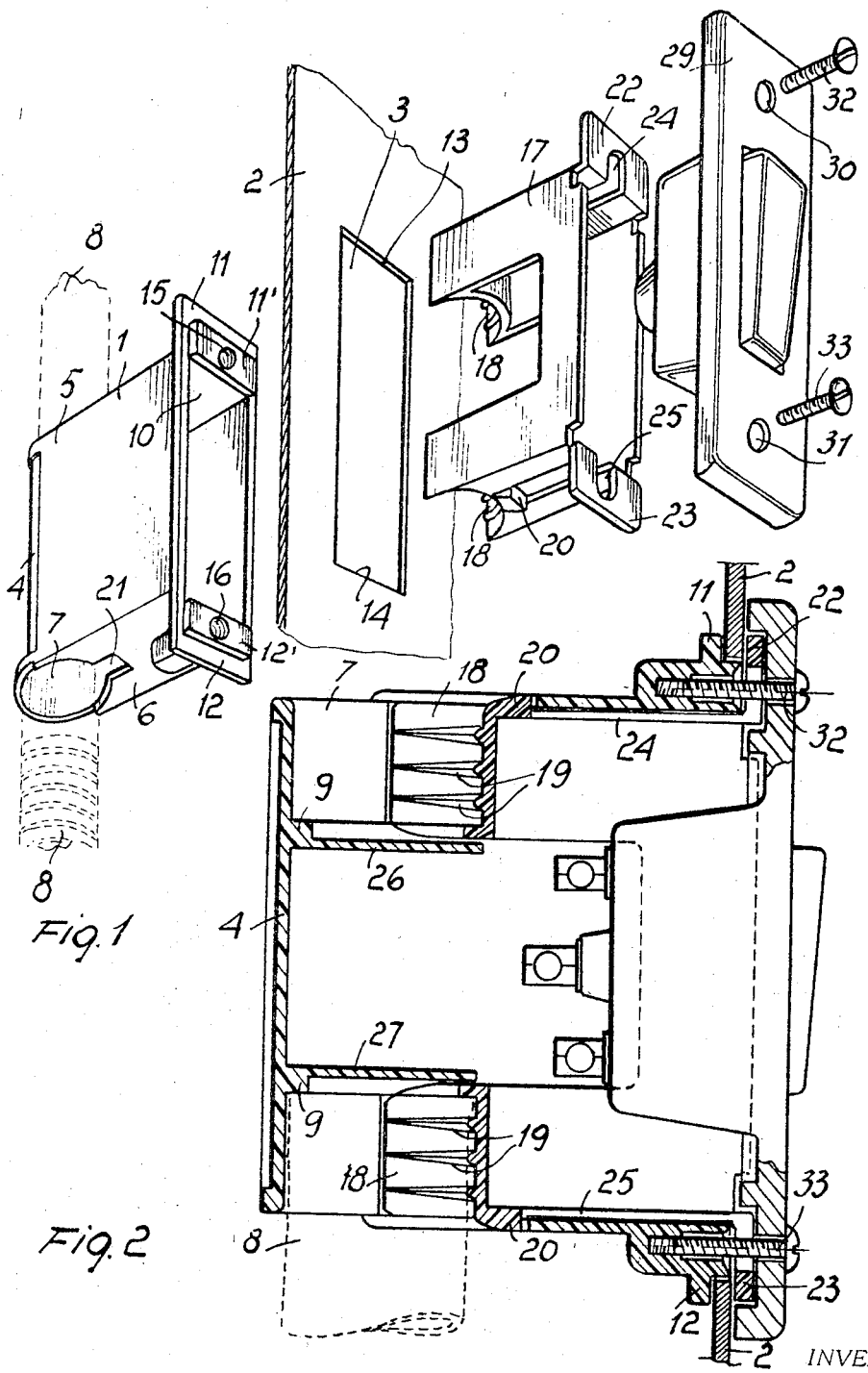

This invention relates to an assembly for mounting an electric device (e.g. a switch) and particularly to an assembly suitable for fixing electric devices on walls or other surfaces, of flattened structure.

According to the present invention we provide an assembly for mounting an electric device (e.g. a switch) comprising a hollow housing element having a first opening at one side and a second opening adapted to receive an electric circuit, a plate having an aperture corresponding in size and shape to the first opening, and a hollow frame element insertable through the plate aperture and into the housing element and which can be secured therein by snap-action between one or more tongues on each element and a corresponding slot or slots on the other element, the frame having at least one surface adapted to engage and clamp a conduit when the latter and the frame element are inserted in the hollow housing element.

An illustrative embodiment of the invention will now be described with reference to the accompanying drawing, in which:

FIGURE 1 shows an exploded view of the assembly, and

FIGURE 2 shows a cross-section of the assembly.

With reference to both FIGURES 1 and 2, the assembly comprises a hollow housing element with an opening on one side adapted to be mounted against the rear of a plate 2 having an aperture 3 which is substantially the same size as the opening in the hollow housing element. The hollow housing element can be plastered into a wall or fixed in some other suitable way after a conduit has been engaged therewith (to be described later).

The hollow housing element has a semicylindrical wall 4, lateral walls 5 and end walls 6 which have two co-axial circular second opening 7 partly defined by the wall 4, and into which conduit 8, carrying the electric cables, can be easily inserted until they reach a stop 9 of semi-circular shape.

A flange is located around the first opening 10 in the hollow housing element, and this flange has two enclosed parts 11 and 12. The enclosed parts of the flange are intended to rest against the rear wall of the plate 2. On the parts 11 and 12 of the flange are bosses 11' and 12' which are positioned so as to pass through the opening 3 and engage edges 13 and 14 to locate the plate 2. The bosses are provided respectively with screw threaded holes 15 and 16.

An insertable hollow frame element 17 has a concave wall 18 provided with strong ribs 19 which engage conduits 8 when the insertable hollow frame element is pushed fully home in the hollow housing element. Each of two opposed end walls of the insertable hollow frame element 17 has a flexible wedge-shaped tongue 20, adapted to engage a co-operating slot 21 in a respective one of the side walls 6 of the hollow housing element. Thus, by this means the insertable hollow frame element 17 is detachably mounted to the hollow housing element 1.

The insertable hollow frame element 17 has tongues 22 and 23 from which slots 24 and 25 extend along the two opposed end walls of the insertable hollow frame element 17. The slots are bounded at the other end by wedge-shaped tongues 20. The slots 24 and 25 extend into the tongues 22 and 23 to provide an extension to the screw-threaded holes 15 and 16 of the hollow housing element 1, so that screws 32 and 33 (to be described later) can pass through the tongues 22 and 23.

In the hollow housing element 1, the stops have projections 26 and 27 of a thin-walled material which closes the second hole 7 when conduits are not engaged therein. The thin-walled projections 26 and 27 are easily turned back or removed to allow the passage of power cables, when a conduit is introduced into the corresponding second hole 7.

In assembly, the electric device to be mounted, for instance a switch 29, is introduced into the insertable hollow frame element 17 in such manner that its cover plate fully covers the insertable hollow frame element 17, while two holes 30 and 31 in the cover plate are disposed co-axially with screw-threaded holes 15 and 16. The two screws 32 and 33 can then pass through the holes 30 and 31 and slots 24 and 25 in order to be screwed fully into screw-threaded holes 16 and 15. When the screws are fully into screw-threaded holes provided thereto, plate 2 is firmly held in place by means of the pressure exerted between the part of the flange 11 and the tongue 22 and at one end and the corresponding part of the flange 12 and the tongue 23 at the other. Conduit 8 is also held rigidly against any movement because the concave wall 18, showing ribs 19, is held firmly in its respect, said conduit 8 being supported at its rearward or bottom side by the wall 4.

The installation of the assembly is carried out by engaging the hollow housing element 1 with the plate 2 such that bosses 11' and 12' project through the aperture 3. The insertable hollow frame element 17 is then introduced through the aperture 3 and into the hollow housing element 1, where it is engaged by the snap-action of the flexible shaped tongue 20 with the slots 21. The assembly is then fully secured to the conduits 8 and the hole is then embedded in plaster, mounted on a prefabricated panel or positioned in the surround of a door or like member. The electric wires already situated in the conduit can then be connected to the electric device which is finally secured onto the assembly.

To change the electric device is then simply a matter of unscrewing the electric device, disconnecting the cables, reconnecting the cables to a new device, and rescrewing the new device onto the assembly.

What I claim is:

1. An assembly for mounting an electric device (e.g. a switch) comprising a hollow housing element having a first opening at one side and a second opening adapted to receive an electric circuit, a plate having an aperature corresponding in size and shape to the first opening, and a hollow frame element insertable through the plate aperture and into the housing element, and which can be secured therein by snap-action between one or more tongues on one element and a corresponding slot or slots on the other element, the frame element having at least one surface adapted to engage and clamp a conduit when the latter and the frame element are inserted in the hollow housing element.

2. An assembly as claimed in claim 1 in which the hollow housing element has a convex semi-cylindrical shaped wall at its side opposed to that of the first opening and in which the semi-cylindrical wall defines part of the second opening.

3. An assembly as claimed in claim 2 in which the frame element has a concave semi-cylindrical shaped surface which is adapted to engage the wall of the conduit.

4. An assembly as claimed in claim 3 in which the hollow housing element is secured to the frame element which can co-operate with appropriately positioned slots in the hollow housing element.

5. An assembly as claimed in claim 1 in which the hollow housing element has two flaps, one arranged on each of the opposed edges of the first opening and each having a hole for registering with a respective one of the screw-threaded bores for the passage of a screw.

6. An assembly, as claimed in claim 2, wherein the hollow housing element has a thin-walled projection covering the second opening, and which is deformable by means of pressure, to provide space for electric cables to pass from the conduit into the hollow housing element.

References Cited

UNITED STATES PATENTS 3,226,469   12/1965   Majors _____ 220—3.3

THERONE E. CONDON, *Primary Examiner.*

J. B. MARBERT, *Assistant Examiner.*